United States Patent [19]

Vasishth et al.

[11] 4,240,940

[45] Dec. 23, 1980

[54] WATER CLEAN UP AEROSOL PAINT

[75] Inventors: Ramesh C. Vasishth, Danville; Robert S. Wang, Concord, both of Calif.

[73] Assignee: Envirosol Systems International, Ltd., Orinda, Calif.

[21] Appl. No.: 13,331

[22] Filed: Feb. 16, 1979

[51] Int. Cl.³ .......................... B67B 7/00; C09D 3/64; C09D 3/72

[52] U.S. Cl. ............................ 260/22 R; 260/22 TN; 260/29.2 TN; 260/29.2 UA; 260/29.2 E; 260/32.6 R; 260/33.2 R; 260/33.4 R; 260/33.4 UR; 260/33.6 R; 260/33.6 UB; 260/33.8 R; 260/33.8 UB; 427/236; 222/1; 222/4

[58] Field of Search ........ 260/22 TN, 22 R, 29.2 TN, 260/29.2 UA, 29.2 E, 33.2 R, 32.6 R; 222/1, 4; 427/236

[56] References Cited

U.S. PATENT DOCUMENTS

| | | | |
|---|---|---|---|
| 4,025,476 | 5/1977 | Miller et al. | 260/22 CQ |
| 4,051,089 | 9/1977 | Tobias et al. | 260/22 CQ |
| 4,094,836 | 6/1978 | Yasui et al. | 260/22 CQ |
| 4,124,555 | 11/1978 | Gross et al. | 260/33.2 R |
| 4,125,499 | 11/1978 | Howard | 260/22 CB |
| 4,140,729 | 2/1979 | Tobias et al. | 260/33.2 R |

OTHER PUBLICATIONS

Singer, Fundamentals of Paint, Varnish, and Lacquer Technology, American Paint Journal Company, St. Louis, Mo. 1957, pp. 52–62 and 316.
Technical Service Data Sheet TD–78108, Spencer Kellogg Div. of Textron Inc., Aug. 31, 1978.
Product Data Sheet 75, Cargill Technical Information, Chemical Products Div., Sep. 15, 1976.

*Primary Examiner*—Ronald W. Griffin
*Attorney, Agent, or Firm*—Townsend and Townsend

[57] ABSTRACT

An improved aerosol paint formulation which can be cleaned up with water, comprising a water soluble film forming resin in a solvent system of water soluble solvent and water insoluble solvent. The solvent system contains a relatively large proportion of water insoluble solvent for economy and fire safety.

6 Claims, No Drawings

WATER CLEAN UP AEROSOL PAINT

This invention relates to aerosol paints of the type that can be cleaned up with water.

U.S. Pat. No. 4,125,499 to Jerald D. Howard discloses a water clean up aerosol paint and container from which the paint can be sprayed. The paint contains a film forming resin that has been rendered water soluble through neutralization of acid groups by an amine or ammonia, together with a water soluble solvent for the water soluble resin. The Howard patent teaches that to be successfully sprayed from the aerosol container the paint formulation should contain little, and preferably no, water in the aerosol can.

The Howard patent also teaches in column 3, lines 38–40 that only a small amount of water insoluble solvent can be tolerated in the aerosol paint formulation. The working examples in the Howard patent consistent with this teaching do not contain any water insoluble solvent but utilize relatively large amounts of water soluble acetone as part of the water soluble solvent system.

Contrary to these latter noted teachings in the Howard patent concerning water insoluble solvent, it has been found that relatively large amounts of water insoluble solvent can be used advantageously and a highly satisfactory product having water clean up properties is obtained. The discovery upon which the present invention is based permits elimination of water soluble solvents such as acetone and substitution thereof with water insoluble solvents such as V.M.&P. naphtha. The resulting product provided by this invention offers a cost savings in that V.M.&P. naphtha is less expensive than acetone. Most importantly, a fire safety benefit is obtained through the use of solvents having higher flash points. For example, the Tag open cup flash point for acetone is 5–6° C., while the Tag open cup flash point for V.M.&P. naphtha is 30–60° C.

Accordingly, the present invention provides an aerosol container having propellant therein, and an improved paint formulation in said container comprising: about 10–60 weight percent, preferably about 15–35 weight percent, of a water soluble film forming resin, about 10–30 weight percent, preferably about 15–30 weight percent, of a water soluble solvent for said resin, about 10–60 weight percent, preferably about 25–45 weight percent, of a water insoluble solvent for said resin, and not more than about 8 weight percent, preferably less than about 1 weight percent, of water.

The present invention contemplates gloss and satin clear varnish formulations, as well as those having pigments of various colors in amounts up to about 40 weight percent of the formulation. As is well known in the art, there are a number of additives which are conventionally used in aerosol paint formulations and the following table in percent by weight indicates the amounts of a number of such materials which may optionally be included.

| | |
|---|---|
| Water soluble resin | 10–60% |
| Water soluble solvent | 10–30% |
| Water insoluble solvent | 10–60% |
| Pigments | 0–40% |
| Drier | 0.01–2.0% |
| Wetting agent | 0–3.0% |
| Flattening agent | 0–20% |
| Anti-settling agent | 0–3.0% |

The important aspect of the present invention is the novel solvent system which includes sufficient water soluble solvent of the type used in the Howard patent to impart water clean up properties to the system. The balance of the solvent system can be made up with any water insoluble solvent or mixtures of such solvents that is a solvent for the film forming resin used in the paint. Typical water insoluble solvents are aliphatic hydrocarbon solvents such as hexane, heptane, aromatic hydrocarbon solvents such as toluene and xylene, and, in the preferred embodiment, the solvent commonly used in the paint industry known as V.M.&P. naphtha. V.M.&P. naphtha is defined in *The Condensed Chemical Dictionary*, Eighth Edition, as follows:

"(petroleum spirits; petroleum thinner; mineral spirits; mineral thinner). Any of a number of narrow-boiling-range fractions of petroleum with boiling points of about 200 to 400° F.; according to the specific use; distillation range 246 to 290° F.; sp. gr. 0.7543; density 6.280 lbs/gal; pour point below −70° F.; flash point 57° F. (TCC)."

Other water insoluble solvents such as benzyl alcohol or chlorinated solvents may also be used, provided the solvent or solvent mixture is selected so as to give a paint base that when packaged in an aerosol has the desirable properties of proper sprayability, film formation, Tag time, etc.

Apart from the novel solvent system utilized in the present paint formulation, the other parameters are essentially the same as those disclosed in the above cited Howard patent and the disclosure thereof is incorporated herein by reference as to those other aspects of the invention, including the aerosol container, types and amounts of volatile propellants which are utilized therein for spraying the paint formulation, types of water soluble film forming resins that may be utilized, types of water soluble solvents that may be used, pigments and the like. With respect to neutralization of the resin to render it water soluble, it has been found that with certain types of resins it is desirable to carry out the neutralization with an organic amine as distinguished from the ammonia alternative for better stability of the paint.

The present invention is illustrated by the following examples which provide typical formulations that can be packaged in an aerosol container along with propellant and applied to a surface by spraying. These formulations can be cleaned up with water for up to about ten minutes after being sprayed on a surface.

EXAMPLE 1

| Water Soluble White Aerosol Paint Base | | | |
|---|---|---|---|
| Ingredients | % wt. | % water soluble solvent | % water insoluble solvent |
| Aquamac 1000* | 21.88 | 6.56 | |
| AMP-95** | 1.44 | | |
| Titanium Dioxide | 20.89 | | |
| BYK 301*** | 0.22 | | |
| 6% Cobalt Naphthenate**** | 0.22 | | |
| 6% Manganese Naphthenate**** | 0.18 | | |
| Activ-8**** | 0.05 | | |
| Ethylene Glycol Monobutyl Ether***** | 5.89 | 5.89 | |
| Butyl Carbitol | 4.77 | 4.77 | |
| V.M. & P. Naphtha | 44.46 | | 44.46 |

EXAMPLE 1-continued

Water Soluble White Aerosol Paint Base

| Ingredients | % wt. | % water soluble solvent | % water insoluble solvent |
|---|---|---|---|
| Total | 100.00 | 17.22 | 44.46 |

*Aquamac 1000 is a water reducible alkyd resin obtained from International Minerals and Chemical Corporation. It is a 70% solution in butyl cellosolve and n-butanol.

**2-amino-2-methyl-1-propanol containing 5% water

***wetting agent

****drier

*****butyl Cellosolve

EXAMPLE 2

Water Soluble Yellow Aerosol Base Paint

| Ingredients | % wt. | % water soluble solvent | % water insoluble solvent |
|---|---|---|---|
| Aquamac 1000 | 41.35 | 10.34 | |
| AMP-95 | 2.61 | | |
| Titanium Dioxide | 8.22 | | |
| Dalmar Yellow | 1.67 | | |
| Minex 7* | 1.96 | | |
| Ethylene Glycol Monobutyl Ether | 10.90 | 10.90 | |
| Butyl Carbitol | 3.26 | 3.26 | |
| 6% Cobalt Naphthenate | 0.41 | | |
| 6% Manganese Naphthenate | 0.29 | | |
| BYK 301 | 0.25 | | |
| Activ-8 | 0.10 | | |
| V.M. & P. Naphtha | 28.98 | | 28.98 |
| Total | 100.00 | 24.50 | 28.98 |

*filler

EXAMPLE 3

Water Soluble Clear Gloss

| Ingredients | % wt. | % water soluble solvent | % water insoluble solvent |
|---|---|---|---|
| XP-4366*, 70% NV Resin | 49.57 | 14.87 | |
| 28% Ammonium Hydroxide | 2.11 | | |
| Cobalt Hydrocure** | 0.07 | | |
| Manganese Hydrocure** | 0.07 | | |
| Activ-8 | 0.06 | | |
| L-5310*** (20% in butyl cellosolve) | 0.23 | 0.18 | |
| Ethylene Glycol Monobutyl Ether | 14.63 | 14.63 | |
| V.M. & P. Naphtha | 33.26 | | 33.26 |

EXAMPLE 3-continued

Water Soluble Clear Gloss

| Ingredients | % wt. | % water soluble solvent | % water insoluble solvent |
|---|---|---|---|
| Total | 100.00 | 29.68 | 33.26 |

*This is a water reducible oil modified urethane in Butyl Cellosolve, glycol ester, ketone ether solvent combination obtained from Spencer Kellogg Division of Textron Inc.

**drier

***wetting agent

EXAMPLE 4

Water Soluble Clear Satin

| Ingredients | % wt. | % water soluble solvent | % water insoluble solvent |
|---|---|---|---|
| XP-4366, 70% NV Resin | 45.46 | 13.64 | |
| 28% Ammonium Hydroxide | 1.94 | | |
| Cobalt Hydrocure | 0.07 | | |
| Manganese Hydrocure | 0.07 | | |
| Activ-8 | 0.55 | | |
| Silica (Zeothir-95) | 4.67 | | |
| Ethylene Glycol Monobutyl Ether | 16.00 | 16.00 | |
| V.M. & P. Naphtha | 31.24 | | 31.24 |
| Total | 100.00 | 29.64 | 31.24 |

We claim:

1. In an aerosol container having propellant therein, an improved paint formulation in said container comprising: about 15-35 weight percent of a water soluble film forming resin, about 15-30 weight percent of a water soluble solvent for said resin, about 25-45 weight percent of a water insoluble solvent for said resin, and not more than about 8 weight percent of water.

2. The improved paint formulation of claim 1 wherein there is present less than about 1 weight percent of water.

3. The improved paint formulation of claim 2 wherein said water insoluble solvent for said resin is V.M.&P. naphtha.

4. The improved paint formulation of claim 3 wherein said water soluble solvent is selected from ethylene glycol monobutyl ether and diethylene glycol monobutyl ether.

5. The improved paint formulation of claim 1 wherein said paint formulation includes up to about 40 weight percent of pigment therein.

6. The improved paint formulation of claim 1 in which said paint formulation has the following ingredients in weight percent:

| | |
|---|---|
| Water soluble resin | 15-35% |
| Water soluble solvent | 15-30% |
| Water insoluble solvent | 25-45% |
| Pigments | 0-40% |
| Drier | 0.01-2.0% |
| Wetting agent | 0-3.0% |
| Flattening agent | 0-20% |
| Anti-settling agent | 0-3.0% |

* * * * *